United States Patent [19]

Morikawa et al.

[11] 4,055,614

[45] Oct. 25, 1977

[54] METHOD OF FIRING FORMED CERAMIC BODY

[75] Inventors: Akira Morikawa; Yoshinori Narita, both of Nagoya, Japan

[73] Assignee: NGK Spark Plug Co., Ltd., Nagoya, Japan

[21] Appl. No.: 653,527

[22] Filed: Jan. 29, 1976

Related U.S. Application Data

[63] Continuation of Ser. No. 488,679, July 15, 1974, abandoned.

[30] Foreign Application Priority Data

July 24, 1973 Japan .................................. 48-83470

[51] Int. Cl.$^2$ ............................................. C04B 33/32
[52] U.S. Cl. ........................................ 264/59; 264/63; 264/65
[58] Field of Search .................... 264/61, 63, 56, 59

[56] References Cited

U.S. PATENT DOCUMENTS

| | | | |
|---|---|---|---|
| 2,976,598 | 3/1961 | Creutz | 264/65 |
| 3,936,580 | 2/1976 | Ward et al. | 264/61 |

*Primary Examiner*—Robert F. White
*Assistant Examiner*—John Parrish
*Attorney, Agent, or Firm*—Stevens, Davis, Miller & Mosher

[57] ABSTRACT

A method of firing a formed ceramic body containing organic components comprising the steps of covering a formed raw ceramic body containing organic components as its plasticizer and bonding agent, with a metal foil capable of being oxidized at a high temperature, and firing such a metal-foil covered ceramic body. The method is particularly useful for manufacturing a honeycomb-shaped catalyzer carrier made of ceramic having a number of holes for a device for purifying exhaust gases.

6 Claims, No Drawings

METHOD OF FIRING FORMED CERAMIC BODY

This is a continuation of application Ser. No. 488,679 filed July 15, 1974 now abandoned.

This invention relates to a method of firing a formed ceramic body containing organic components.

In general, a high purity oxide ceramic composition is mixed with an organic bonding agent, plasticizer and solvent for the purpose of compensating the poor plasticity of the ceramic composition thereby to make the resulting mixture be easily formed into desired shapes and dimensions by pressing, extrusion, rolling and the like.

In case of forming by extrusion a ceramic body especially when it is thin in thickness and complex in shape such, for example, as a honeycomb-shaped ceramic body having a number of holes partitioned from each other by a thin wall and being recently used as a catalyzer carrier provided for a device for purifying exhaust gases, a high purity oxide ceramic composition must be mixed with an organic bonding agent and plasticizer, and as a result, to fire the resulting mixture by the conventional firing techniques has been encountered with great difficulties.

That is, in the conventional firing techniques the ceramic body containing organic components as the bonding agent, plasticizer and the like must be pre-heated at a low temperature prior to the firing so as to evaporate and eliminate the organic components. Such low temperature heat treatment may be accomplished by a number of methods depending on the dimensions of the formed ceramic body, and the amount of the organic components contained therein. For example, in case of forming a raw ceramic sheet of about 1 mm thickness by rolling a ceramic composition containing alumina whose purity is 95%, 100 parts by weight of the ceramic composition must be mixed with not less than 15 parts by weight of an organic mixture consisting of equivalent amounts of resinous bonding agent and resinous plasticizer. As a result, after the ceramic composition has been formed into the ceramic body, the ceramic sheet must be heated at a temperature of 200° C to 300° C for such a long time as 12 to 24 hours to evaporate and oxidate the resinous matter. Therefore, it has been learned that the above described long time heat treatment results in a significantly difficulty in producing formed ceramic bodies in mass-production scale.

In addition, for instance it is very difficult to manufacture a sufficiently perfect honeycomb-shaped catalyzer carrier made of ceramic adapted for use in a device for purifying exhaust gas because it is extremely complex in construction such that a catalyzer carrier shows cracks and strains even in the extrusion or pressing process. In order to solve such difficulties, in the past a dipping method was proposed including making a honeycomb-shaped paper mold and immersing the paper mold into a ceramic paste or slip to make a paper-cored ceramic mold. Such a dipping method, however, has the disadvantage that the ratio of paper to ceramic in the paper-cored ceramic mold is large, and accordingly the paper-cored ceramic mold must be subjected to a preliminary heat treatment for an extremely long time in order to effect carbonization, burning and evaporation of the core paper prior to firing.

An object of the invention is to provide a method of firing a formed raw ceramic body containing a much amount of organic components such as paper, by which the organic components can be evaporated and oxidized in a significantly shorter time when compared to the conventional method and by which a formed raw ceramic body which is complex in construction and/or very thin in thickness can be produced in a mass-production scale.

A feature of the invention is the provision of a method of firing a formed raw ceramic body containing organic components comprising the steps of covering the formed raw ceramic body containing a much amount of organic components as its plasticizer and bonding agent, with a metal foil capable of being oxidized at a high temperature, and firing such a metal foil covered ceramic body.

The invention will now be described in greater detail with reference to the following practical examples.

EXAMPLE 1

100 parts by weight of ceramic composition adapted for use in the conventional integrated circuit ceramic substrate and consisting of 97% by weight of $Al_2O_3$ as its main ingredient and 1.5% by weight of $SiO_2$, 1.0% by weight of MgO and 0.5% by weight of CaO as its mineralizers were mixed and blended with 12 parts by weight of ethyl cellulose powder as a plasticizer, 5 parts by weight of dioctyl phthalate as a caking agent and 7 parts by weight of acetone and 8 parts by weight of xylene as solvents. The mixture thus obtained was formed by rolls into a plate having a thickness of 0.8 mm. The plate was punched into a rectangular plate of 30mm × 40mm × 0.8mm. 100 pieces of these rectangular plates were exposed in the air for 10 hours so as to evaporate the volatile solvents themselves. Subsequently, 5 pieces of these rectangular ceramic plates were superimposed one upon the other to form a set of laminated body with a sand layer sandwiched between the adjacent ceramic plates. 20 sets of the laminated bodies were thus prepared. 10 sets of these laminated bodies were covered with an aluminum foil of 20μ thickness × 200mm width × 200mm length available in market and the other 10 sets of the laminated bodies were not covered with the aluminium foil. These two groups of the laminated bodies were fired to 1,580° C in a gas tunnel furnace with the temperature rising at a rate of 100° C/hr. and then cooled at a cooling rate of 100° C/hr. Subsequently, all of the plates were separated from each other with the aid of the intermediate sand layer and then examined. Only 2 pieces of the 50 pieces of the ceramic plates fired being covered with the aluminum foil showed cracks, while 20 pieces of the 50 pieces of the fired ceramic plates fired being not covered with the aluminum foil showed cracks.

EXAMPLE 2

100 parts by weight of a cordierite ceramic composition powder consisting of 13.8% by weight of magnesia, 34.9% by weight of alumina and 51.3% by weight of silica and having particle sizes of not exceeding 5 μ was added with 10 parts by weight of epoxy resin as a caking agent, 5 parts by weight of a hardening agent and 20 parts by weight of dioctyl phthalate together with 65 cc of acetone as a solvent. These constituents were mixed within a ball mill to form a ceramic slip.

On the other hand provision was made of two cylindrical honeycomb-shaped paper molds each having a dimension of 10cm length × 5cm diameter and 500 holes and being made of acetyl cellulose sheet of 0.1mm thickness. These two paper molds were immersed into the above described ceramic slip and then pulled up therefrom and subjected to natural drying so as to evaporate the volatile components such as acetone, thereby obtaining two honeycomb-shaped raw ceramic bodies. One of these two raw ceramic bodies was covered with three sheets of aluminum foil of 20μ thickness × 300mm width × 300mm length, while the other ceramic body was not covered with any aluminium foil. These two ceramic bodies were fired in an oxidizing atmosphere in an electric furnace temperature rising at a rate of 100° C/hr. to 800° C at which these two ceramic bodies were maintained for 2 hours and subsequently were fired again at the temperature rising rate of 100° C/hr. to 1,260° C. These two fired ceramic bodies were compared with each other. On the first honeycomb-shaped ceramic body, the trace of the aluminium foil covering thereon was found in the state of aluminium oxide ashes. When such aluminium oxide ashes were removed, a ceramic honeycomb structure having a porosity of about 35%, and a wall thickness of 0.1 to 0.3 mm and showing no crack and deformation was obtained. On the contrary, the second ceramic honeycomb structure fired being not covered with the aluminium foil thereon showed a number of cracks in a lengthwise direction of the honeycomb holes and therefore could not be used in practice.

As explained hereinbefore, the use of the metal foil capable of being oxidized at a high temperature as a muffling cover of a formed raw ceramic body containing organic compositions ensures an elimination of the generation of cracks and strains caused by the rapid oxidation or rather burning of the organic compositions even when the formed ceramic body is fired under the customary firing schedule, and provides the important advantage that formed ceramic bodies which are complex in shape and/or very thin in thickness can be produced in a mass-production scale.

The reasons why the metal foil covering the formed ceramic body provides the above described advantageous effect are as follows. When the formed raw ceramic body containing organic components is fired in the customary oxidizing atmosphere, the organic components start burning at the low temperature of 250°-450° C from a place where the temperature is highest in the ceramic body, generating heat and abnormally accelerating the burning in a chain reaction manner, throughout the body, and as a result, all of the organic components are quickly burned out to produce an abnormal difference in thermal expansion in the formed ceramic body, which causes cracks and strains. On the contrary, if the formed ceramic body is covered with the metal foil as described in accordance with present invention, the oxidation which triggers the burning of the organic components and the genertion of self-heating are prevented or rather suppressed by the cover of the metal foil, because oxygen supplied from the outside of the cover is accordingly limited. That is, the organic components become gradually softened, foamed, decomposed, analyzed and carbonized without burning in flames. On the other hand, the metal foil meanwhile becomes gradually oxidized as the temperature rises, producing small voids to supply oxygen therethrough into the interior of the cover as the temperature gets high beyond said temperature of 250°-450° C and approaches the sintering temperature of the ceramic body. As a result, the unstable carbonized matter of the organic components becomes gradually burned so that there is no risk of the abnormal thermal expansion of the formed ceramic body being produced without prolonging the firing schedule.

The metal foil may be made of such a metal capable of being oxidized without melting at a temperature range of 450° C to 600° C such, for example, as iron, cobalt, nickel, aluminium, copper, titanium and the alloy thereof. Experimental tests on a nickel foil having a thickness of 20 μ under the same condition as those of the Example 1 have yielded almost the same good result as that of the Example 1. But, the use of the aluminium foil is the most preferable from the economical standpoint and because oxides of aluminium films are stable at a high temperature and are white or rather colorless, and therefore there is no risk of pigmenting the fired ceramic body.

What is claimed is:

1. A method of firing a formed raw ceramic body containing not less than 15% by weight of resinous organic components as a plasticizer and bonding agent and 100 parts by weight of inorganic components, comprising the steps of covering such a formed raw ceramic body with a metal foil capable of being oxidized at a high temperture, and firing said metal foil-covered raw ceramic body in an ordinary oxidizing atmosphere to sinter said body, said metal foil being gradually oxidized at a temperature greater than 250° C said foil suppressing oxidation of said organic components thereby preventing cracking of the ceramic body without lowering the firing temperature.

2. A method of firing a formed raw ceramic as claimed in claim 1, wherein said ceramic body is paper-cored.

3. A method of firing a formed ceramic body as claimed in claim 1, wherein said metal foil comprises a metal selected from the group consisting of iron, cobalt, nickel, aluminum, copper, titanium and alloys thereof.

4. A method of firing a formed raw ceramic body as claimed in claim 1, wherein said ceramic body is honeycomb-shaped.

5. The method of claim 1, wherein said organic components are selected from the group consisting of: one or more of ethyl cellulose, dioctyl phthalate, epoxy resin or acetyl cellulose; and an organic solvent.

6. The method of claim 5, wherein said organic solvent is selected from the group consisting of: acetone or xylene.